United States Patent [19]

Winsor et al.

[11] Patent Number: 4,989,894
[45] Date of Patent: Feb. 5, 1991

[54] INDEPENDENT REAR SUSPENSION

[75] Inventors: Fred J. Winsor, Birmingham; Hadrian A. Rori, Farmington Hills, both of Mich.

[73] Assignee: Chrysler Corporation, Highland Park, Mich.

[21] Appl. No.: 428,705

[22] Filed: Oct. 30, 1989

[51] Int. Cl.⁵ .................................................. B60G 3/00
[52] U.S. Cl. ..................................... 280/690; 280/701
[58] Field of Search ............... 280/688, 689, 690, 697, 280/700, 701

[56] References Cited

U.S. PATENT DOCUMENTS

| | | | |
|---|---|---|---|
| 4,456,282 | 6/1984 | Rumpel | 280/690 |
| 4,466,635 | 8/1984 | Okada et al. | 280/690 |
| 4,650,209 | 3/1987 | Sumimoto | 280/690 |
| 4,671,531 | 6/1987 | Sautter et al. | 280/690 |
| 4,690,426 | 9/1987 | Kubo et al. | 280/690 |
| 4,690,428 | 9/1987 | Fluegge | 280/697 |
| 4,696,488 | 9/1987 | Mitobe et al. | 280/690 |
| 4,729,578 | 3/1988 | Knodo et al. | 280/690 |
| 4,740,011 | 4/1988 | Mitobe et al. | 280/690 |
| 4,740,012 | 4/1988 | Kondo et al. | 280/690 |
| 4,754,992 | 7/1988 | Asanoma | 280/690 |
| 4,765,647 | 8/1988 | Kondo et al. | 280/690 |

*Primary Examiner*—Richard A. Bertsch
*Attorney, Agent, or Firm*—Edward P. Barthel

[57] ABSTRACT

An independent rear suspension system which is affixed to a forward and laterally extending sub-frame prior to being mounted on a vehicle. The suspension includes four links per side, each side including two different length laterally extending upper control arms and rubber ball joint assemblies, one laterally extending lower control arm, and a longitudinally extending trailing arm. Selected locations, lengths and orientations of the respective arms provide inherent predetermined camber and toe patterns. The entire suspension assembly mounts onto the vehicle at four locations via rubber isolators, providing substantially decreased road noise within the vehicle interior.

10 Claims, 6 Drawing Sheets

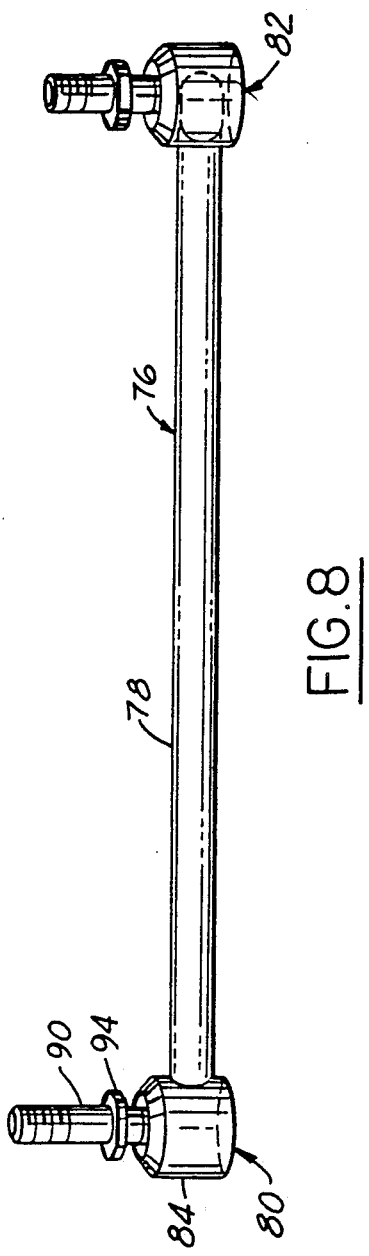
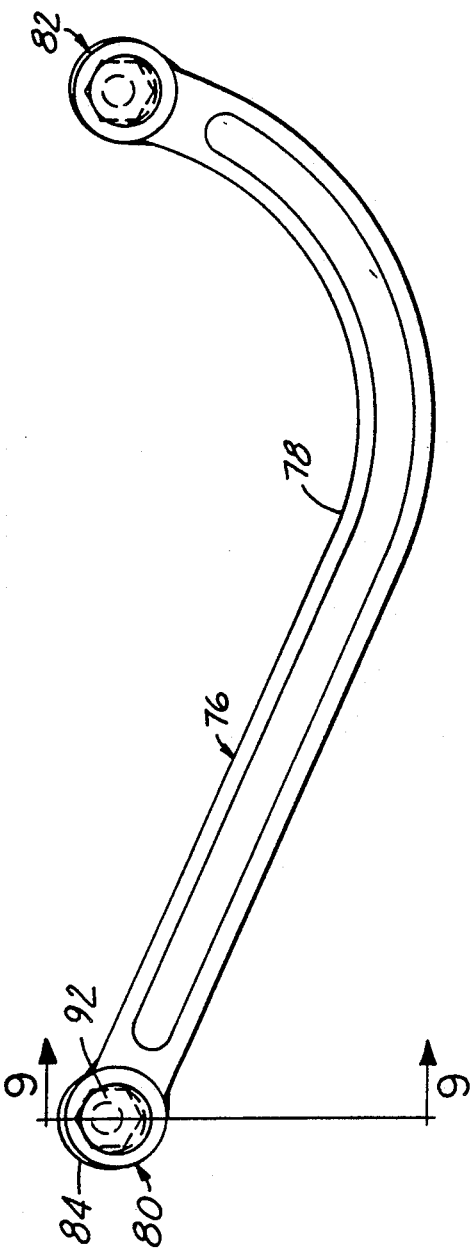
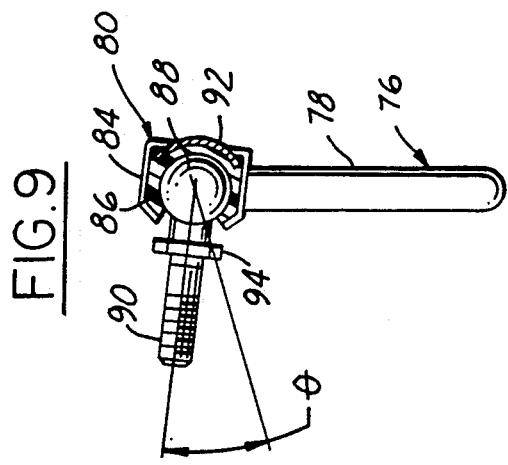

INDEPENDENT REAR SUSPENSION

TECHNICAL FIELD

This invention relates generally to suspension systems and, more particularly, to an independent rear suspension embodying a sub-frame assembly including a multi-link control arm arrangement.

BACKGROUND ART

Heretofore, suspension systems components have been assembled generally individually onto a vehicle body as the latter is conveyed along the assembly line or, if assembled substantially on a sub-frame, they have required six or more mounting locations, and/or a simpler control arm arrangement with minimal tuning advantages.

A rear suspension system whose components are assembled individually, and wherein three lateral links or control arms are utilized, is shown and described in Sumimoto U.S. Pat. No. 4,650,209. The three arms consisting of one upper and two lower arms, are each connected to the vehicle body by respective rubber bushings whose axes are located such that, in a projection to a longitudinally vertical plane, the axes are directed toward the center of swinging movement of a longitudinally extending swing arm.

Another rear suspension arrangement embodying three control arms is shown and described in Asanuma U.S. Pat. No. 4,754,992, wherein two of the control arms are spaced lower arms, and the third is an upper arm. The components are individually assembled onto the vehicle body.

DISCLOSURE OF THE INVENTION

A general object of the invention is to provide an improved rear suspension system which is adaptable to being assembled as a sub-frame prior to installation on a vehicle.

Another object of the invention is to provide a rear suspension sub-assembly which incorporates selected camber and toe settings prior to installation of the sub-assembly on a vehicle.

A further object of the invention is to provide an improved right hand and left hand four link rear suspension system having three control arms and a trailing arm.

Still another object of the invention is to provide a rear suspension system wherein each side thereof includes two upper lateral links or control arms which serve to set camber and/or toe alignment, and one lower lateral link or control arm which supports the weight of the vehicle through a coil spring, carries the primary lateral loads, and is adapted to reduce twist during jounce and rebound.

A still further object of the invention is to include a trailing arm type link on each side of a sub-frame, serving to resist only brake torque and fore and aft road inputs. This trailing arm will provide improved ride characteristics due to its low fore and aft compliance rates.

A still further object of the invention is to provide an independent rear suspension system that is connected to the vehicle body at only four locations and has all input loads isolated therefrom via rubber isolators, serving to substantially decrease road noise from the vehicle interior.

These and other objects and advantages will become more apparent when reference is made to the following drawings and related description.

BRIEF DESCRIPTION OF THE DRAWINGS

FIGS. 7–9 are respective rear, plan, and side elevational views of one of the upper control arms of the inventive sub-frame;

BEST MODE FOR CARRYING OUT THE INVENTION

Figure 1:
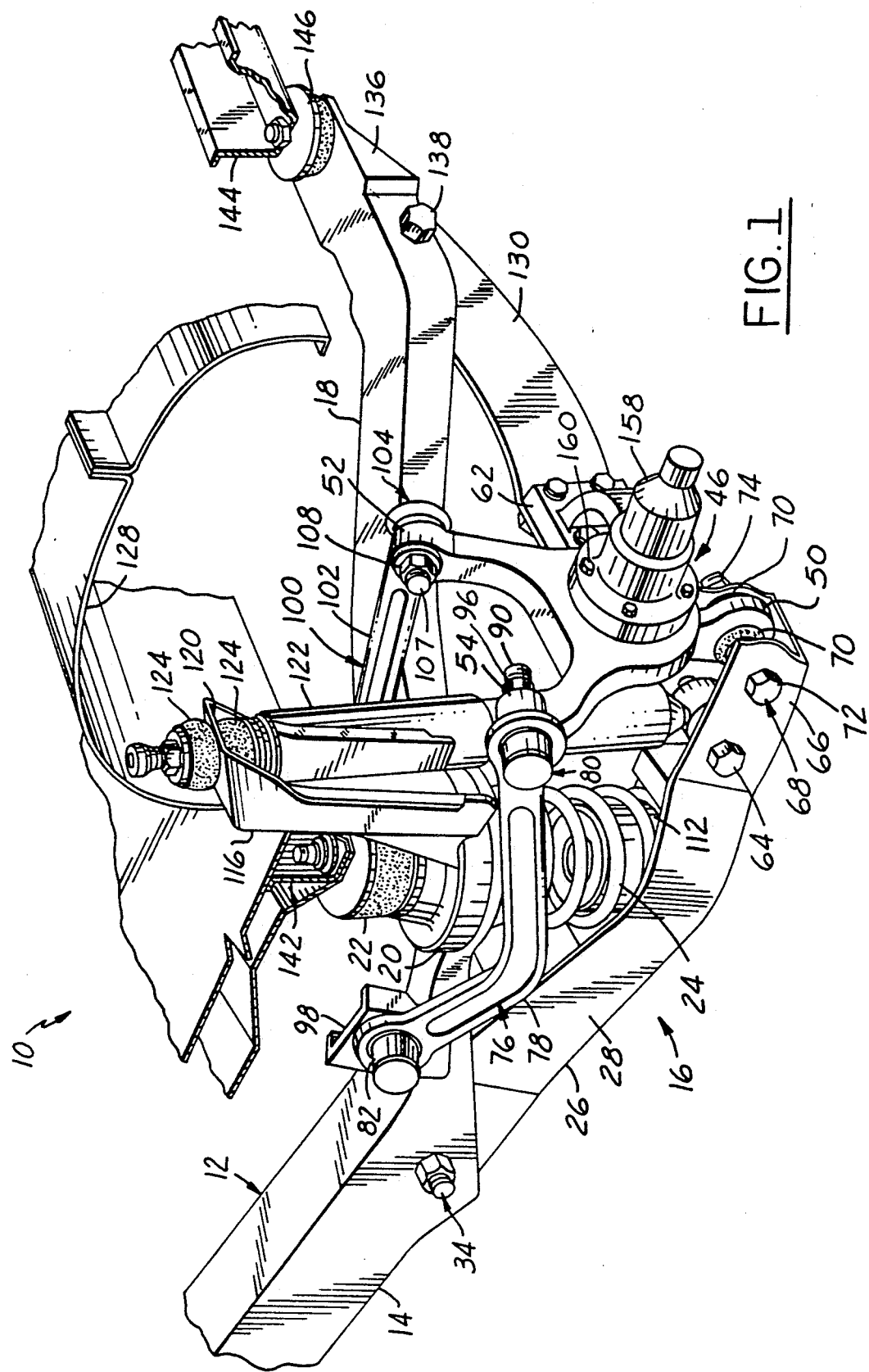
FIG. 1 is a fragmentary perspective view of an independent rear suspension sub-frame embodying the invention.
Figure 2A:
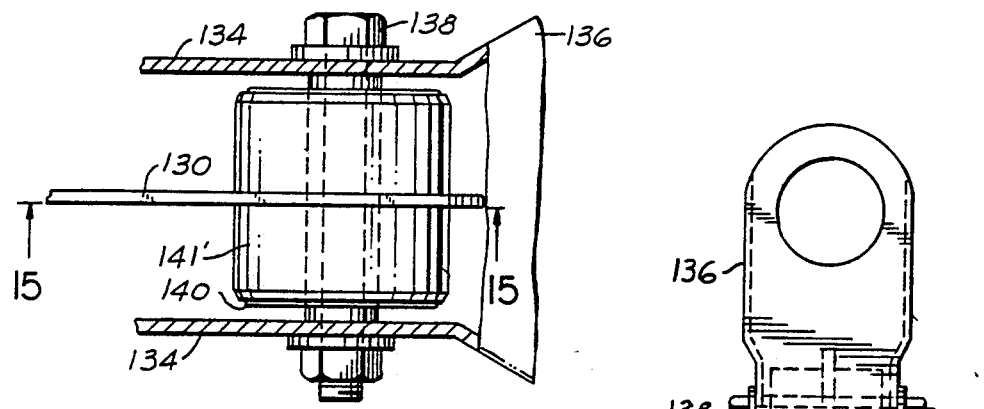
FIG. 2A is a fragmentary elevational view of a portion of the FIG. 2 structure.
Figure 2B:
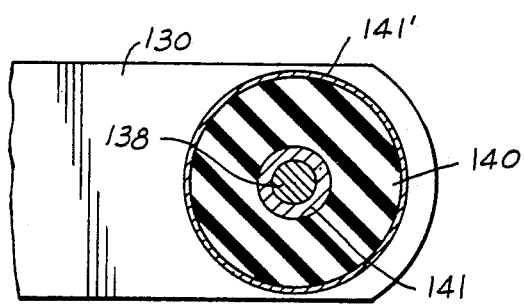
FIG. 2B is a cross-sectional view taken along the plane of the line 2B—2B of FIG. 2A, and looking in the direction of the arrows.
Figure 2:
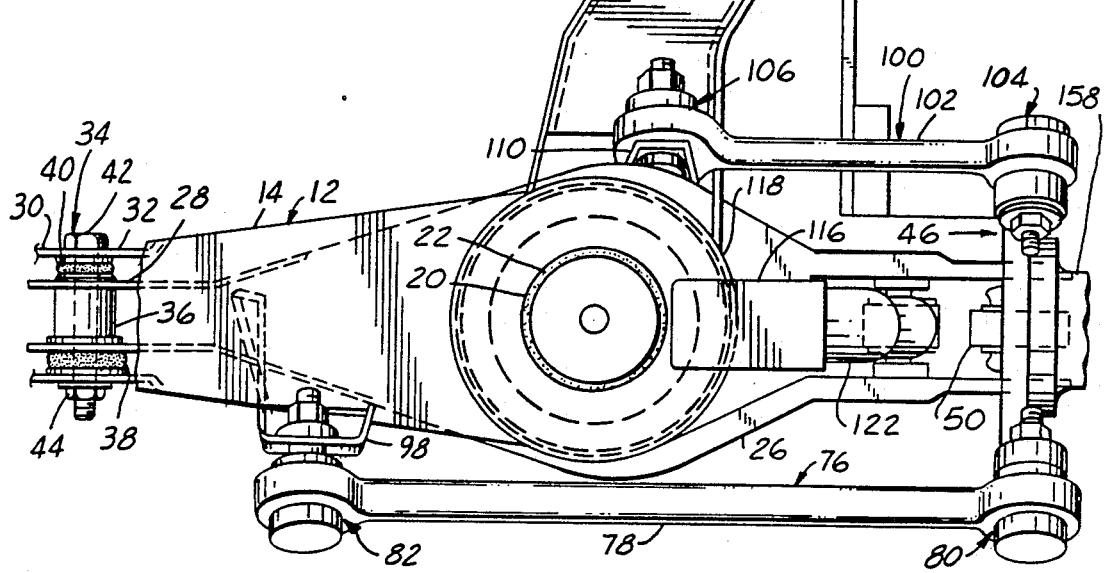
FIG. 2 is a plan view of the FIG. 1 structure.
Figure 3:
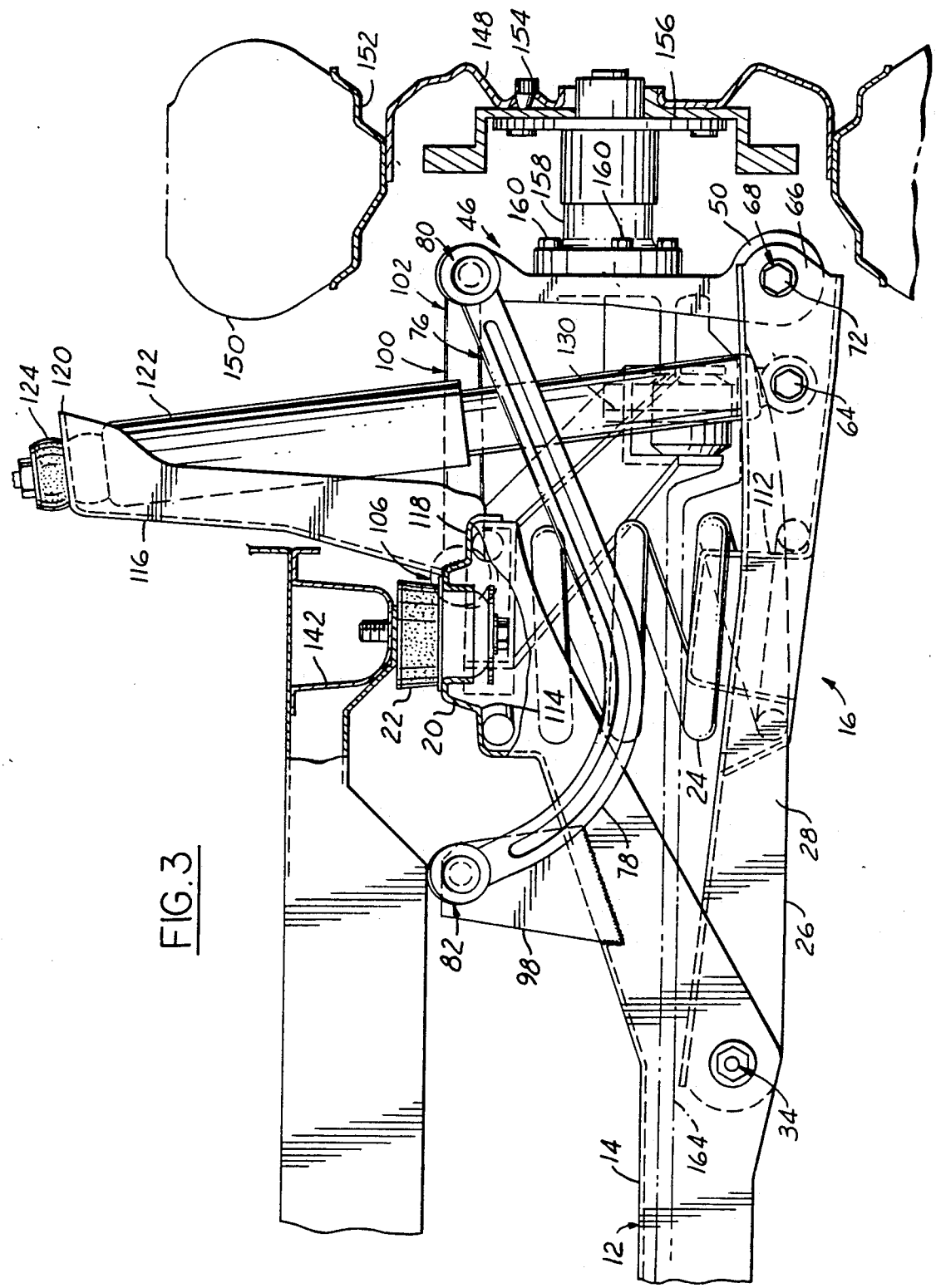
FIG. 3 is a rear view of the FIG. 1 structure.

Referring now to the drawings in greater detail, FIGS. 1–3 illustrate an independent rear suspension 10 including a sub-frame 12 which is adapted to extend laterally across a vehicle at a central inverted U-shaped portion 14 thereof, with right and left rear suspension components 16 operatively mounted thereon. The sub-frame 12 also includes a forwardly extending inverted U-shaped portion 18 formed at each outside end thereof. A circular mounting portion 20, suitable for mounting a rubber isolator 22 on the upper side thereof and a coil spring 24 on the under side thereof, is integrally formed as the juncture between the inverted U-shaped portions 14 and 18.

A U-shaped lower control arm 26 having variable spaced walls 28 is pivotally mounted at its inner end 30 within the spaced walls 32 (FIG. 2) of the central inverted channel portion 14 of the sub-frame 12 by a pivot assembly 34. The latter pivot assembly 34 includes a metal sleeve 36 combined with a three-diameter brushing in such a way that the largest diameter end 38 abuts against the end of the sleeve, while the smallest diameter end 40 extends through the spacer, and the mid-diameter portion is compressed within the spacer. When assembled, the rubber end portions 38 and 40 are mounted inside the respective wall 32, with the spacer 36 extended through an opening 41 formed in one wall 28 of the control arm 26. The walls, spacer and rubber end portions are retained as a unit by a bolt 42 passing therethrough and secured by a nut 44. This arrangement serves to reduce twist in the lower control arm 26 during jounce and rebound.

Figure 5:
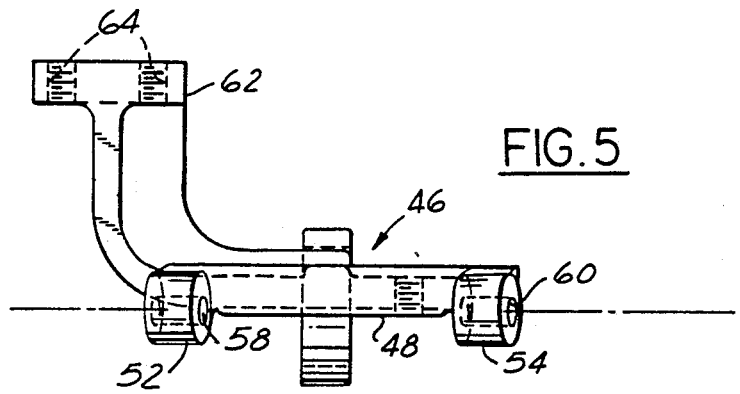
FIGS. 4–6 are respective side elevational plan and end views of the knuckle portion of the inventive sub-frame.
Figure 4:
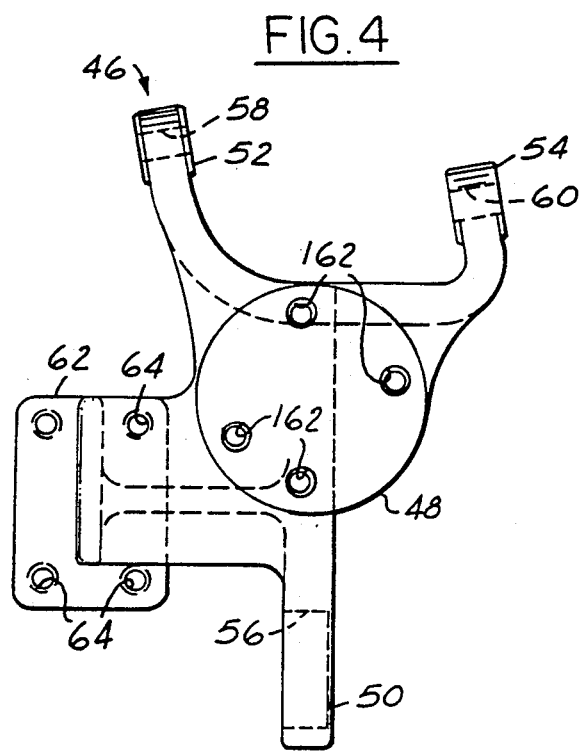
Figure 6:
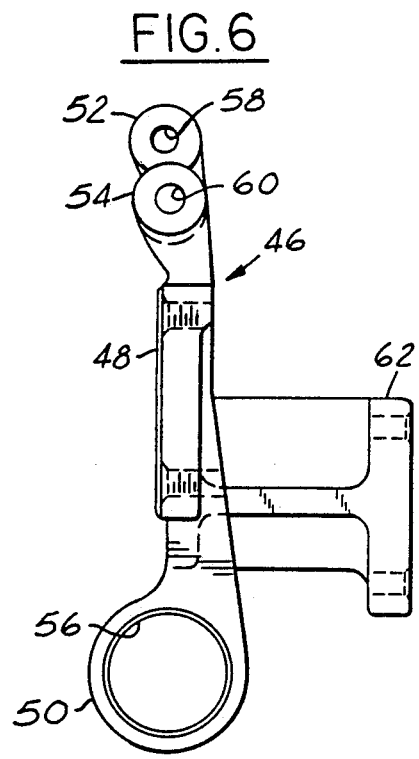

A knuckle 46, shown in detail in FIGS. 4–6, includes central hub portion 48 having a lower mounting lug 50 and two upper fore and aft mounting lugs 52 and 54, respectively, formed thereon. The lugs 50, 52 and 54 have respective openings 56, 58 and 60 formed therethrough. A mounting bracket 62 having four threaded holes 64 formed therethrough is formed to extend forwardly (with respect to the vehicle) of the central hub portion 48, and on a plane spaced a predetermined distance from the plane of the central hub portion inwardly with respect to the vehicle. The knuckle 46 is pivotally connected at its lower mounting lug 50 to the outer U-shaped end 66 of the lower control arm 26 by a pivot member 68 (FIG. 1). The latter pivot member 68 includes a cross-axis ball joint 70 (FIG. 1) on opposite sides of the lug 50, with a bolt 72 extending through the walls 28, the lug 50 and the ball joint 70 and secured by a nut 74.

The long rear (with respect to the vehicle) upper control arm 76, shown in detail in FIGS. 7–9, includes a body portion 78, partially straight and partially bent so as to avoid contacting adjacent vehicle components, with mounting portions 80 and 82 formed on the opposite ends thereof. Each end mounting portion 80 and 82 embodies a ball joint arrangement including a cylindrical cover 84 whose axis is substantially perpendicular to the adjacent axis of the body portion 78. The cylindrical cover encompasses a rubber member 86 molded around a spherical head 88 of a mounting bolt 90 extending from one end of the cylindrical cover. A spherical-shaped cap 92 is mounted in the other end of the spherical cover 84. Since the bolt 90 is pivotally moveable in all directions, as indicated by angle O in FIG. 9, within the cylindrical cover 84, a stop collar 94 is formed on the bolt 90 a predetermined distance from the exit end of the cylindrical cover.

The upper control arm 76 is pivotally mounted at its outer end 80 by virtue of the bolt 90 extending through the opening 60 of the aft mounting lug 54 of the knuckle 46 and secured by a nut 96, and at its inner end 82 by virtue of the bolt 90 extending through a mounting flange 98 (FIG. 1) formed on the outer upper end of the cradle central portion 14 adjacent the circular mounting portion 20.

A short forward (with respect to the vehicle) upper control arm 100 includes a body portion 102 with ball joint mounting portions 104 and 106 formed on the opposite ends thereof, similar to the ball joint ends 80 and 82 of the longer control arm 76. The end 104 is secured to the fore mounting lug 52 of the knuckle 46 by a bolt 107 and nut 108, and the end 106 is secured to a mounting flange 110 (FIG. 2) formed on the outer upper end of the cradle forwardly extending portion 18 adjacent the circular mounting portion 20.

The coil spring 24 (FIGS. 1 and 3) is mounted in between a lower spring seat 112 formed at an intermediate portion of the lower control arm 26, and an upper spring seat 114 (FIG. 3) formed within the circular mounting portion 20 (FIG. 3) of the sub-frame 12.

An upwardly extending shock absorber mounting bracket 116 is formed on an outer edge portion 118 (FIG. 3) of the circular mounting portion 20 of the sub-frame 12. A mounting flange 120 (FIG. 1) is formed at the upper end of the bracket 116. A shock absorber 122 is resiliently mounted at its upper end by rubber bushings 124 (FIG. 1) to the mounting flange 120 of the bracket 116, and pivotally mounted at its lower end by a pivot member 126 (FIG. 1) to the lower control arm 26 at a point intermediate the pivot member 68 and the spring seat 112.

As may be noted in FIGS. 1–3, the upper control arms 76 and 100 straddle the circular mounting portion 20 of the sub-frame 12, and, as indicated in FIG. 1, the shock absorber 122 extends upwardly into the wheel well, represented at 128, without being connected thereto.

A fourth link or, so-called, trailing arm 130 (FIGS. 1 and 2) is secured at its rear end to the mounting bracket 62 by the bolts 132 threadedly secured in the four threaded holes 64 thereof. The forward end of the trailing arm 130 extends to a position intermediate the spaced walls 134 adjacent the forward end 136 of the forwardly extending inverted U-shaped portion 18 of the sub-frame 12, to which it is connected by a through-bolt 138 and a pivot bushing 140. As shown in FIGS. 2A and 2B, the pivot bushing 140 is formed from suitable elastomeric material, and is confined between inner and outer metal sleeves 141 and 141'. The inner sleeve is mounted around the bolt 138, and the outer sleeve 141' is suitably secured, as by press fitting, for example, through an opening formed in the end portion of the trailing arm 130.

Pivot bushing 140 serves to provide a low radial compliance rate which allows large fore and aft suspension excursions to improve ride characteristics. During large fore and aft suspension excursions, the two upper control arms 76 and 100 swing in unison to maintain a predetermined toe pattern.

The sub-frame 12 and the respective right and left components 16 are mounted on vehicle frame rails, represented at 142 and 144, respectively, at two locations on each side of the vehicle. Specifically, the cylindrical mounting portion 20 of the sub-frame 12 is secured through the first isolator 22 (FIG. 3) to the frame rail 142, and the forward end 136 of the forwardly extending inverted channel portion 18 of the sub-frame 12 is secured through a second isolator 146 to the frame rail 144.

A wheel 148 (FIG. 3) with a tire 150 mounted on the rim 152 thereof, is mounted via studs 154 on a mounting plate 156 which, in turn, is mounted on a member 158 secured by bolts 160 threadedly mounted in threaded holes 162 (FIG. 4) formed in the center hub portion 48 of the knuckle 46.

Figure 10:
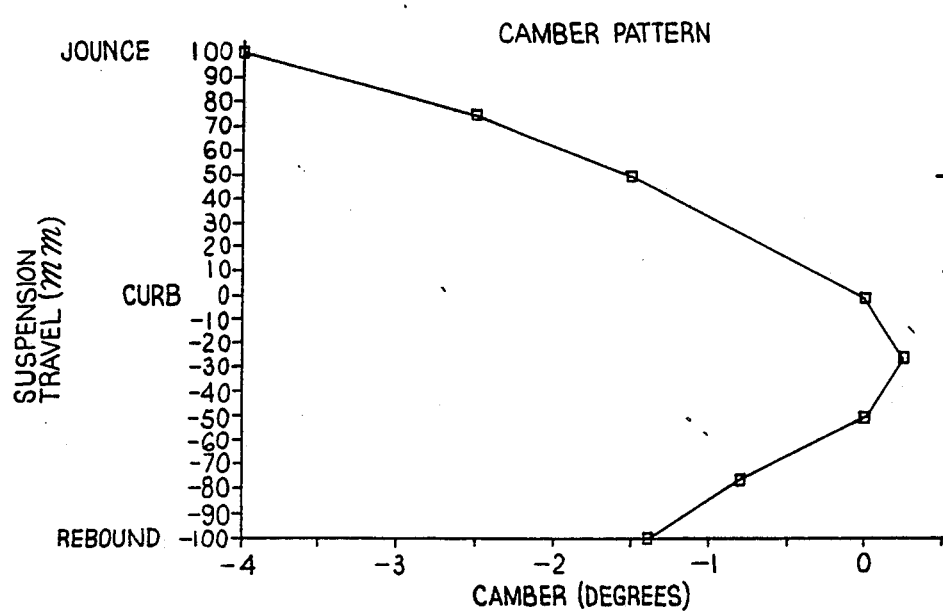
FIG. 10 is a curve illustrating the camber pattern embodied in the inventive sub-frame.
Figure 11:
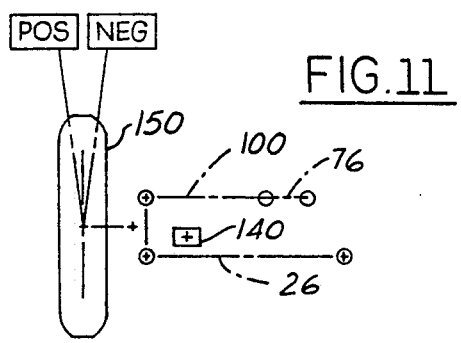
FIG. 11 is a schematic illustration defining the positive and negative camber angles represented in FIG. 10.
Figure 13:
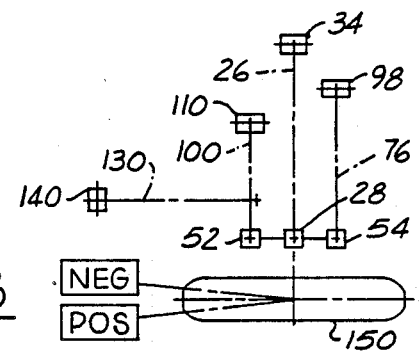
FIG. 13 is a schematic illustration defining the positive and negative toe angles represented in FIG. 12.
Figure 12:
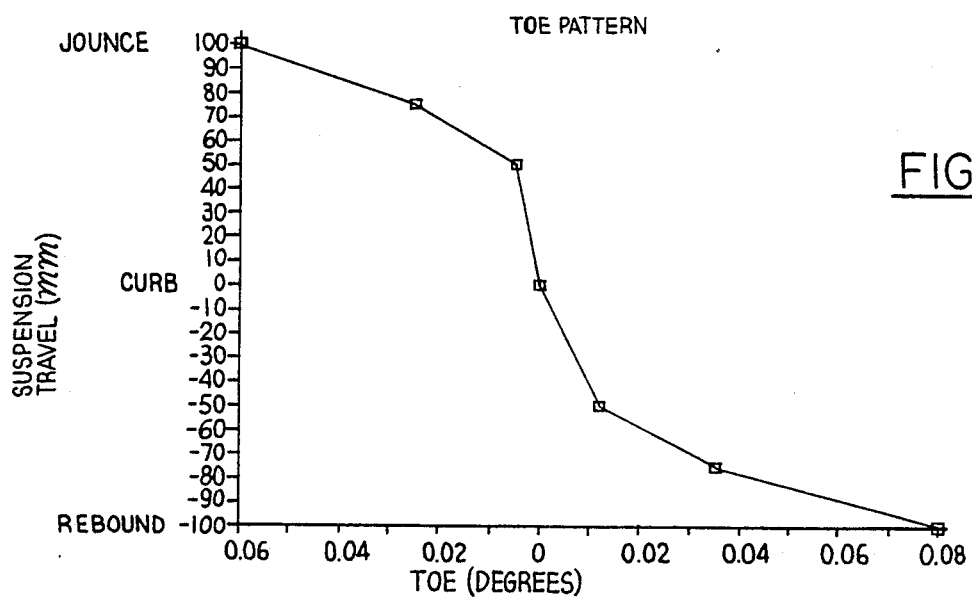
FIG. 12 is a curve illustrating the toe pattern embodied in the inventive sub-frame.

As a result of the above described locations, lengths and orientations of the respective upper and lower control arms, the preferred camber and toe settings on the complete sub-assembly of right and left hand components are inherent in the structure prior to installation of such sub-assembly onto the vehicle along the assembly line. Such preferred camber and toe settings are shown in FIGS. 10 and 13, respectively, for curb and various jounce and rebound conditions. FIGS. 11 and 12, and 14 and 15 are schematic representations of the upper control arms 76 and 100, and trailing arm 130, with respect to positive and negative orientations of the tire 150.

If desired for a particular vehicle application, a swaybar, represented by the phantom line 164 (FIG. 3), may be mounted so as to extend across the right and left hand sub-assembly, parallel to the laterally extending portion 14 of the sub-frame 12, and bent downwardly to be secured at the ends thereof by any suitable fastening means (not shown) to the bottom edge of the bracket 62 of the knuckle 46.

INDUSTRIAL APPLICABILITY

It should be apparent that the invention provides a novel, efficient, and cost effective independent rear suspension system, in that it is completely assembled as a sub-assembly of right and left hand components prior to installation on the vehicle.

It should also be apparent that the inventive rear suspension sub-assembly provides at each side thereof one lower and two upper control arms, wherein the lower control arm supports spring and jounce bumper loads, and the upper control arms utilize rubber ball joints adaptable to allowing conical deflections while maintaining predetermined lateral deflection rates. As such, the axes of the ball joints need not be directed toward the axis of the forward end of the trailing arm 130, as required by the above referenced Sumimoto U.S. Pat. No. 4,650,209, and, hence, are readily adaptable with respect to fitting within the confines of the rear portion of the vehicle.

While but one embodiment of the invention has been shown and described, other modifications thereof are possible within the scope of the following claims.

The embodiments of the invention in which an exclusive property or privilege is claimed are defined as follows:

1. An independent rear suspension sub-assembly for mounting on a frame rail of a vehicle, said sub-assembly comprising a sub-frame having a laterally extending portion, a forwardly extending portion, a spring mounting portion at the juncture of said laterally extending and forwardly extending portions, and a shock absorber mounting bracket extending upwardly from one side of said spring mounting portion; a knuckle having a central wheel mounting portion, a lower control arm mounting portion, an upper leading control arm mounting portion, and an upper trailing control arm mounting portion; a lower control arm pivotally connected at each end thereof between said lower control arm mounting portion and said laterally extending portion of said sub-frame, and having a spring mounting seat formed at an intermediate portion thereof; a first upper control arm pivotally connected at each end thereof between said upper trailing control arm mounting portion and said laterally extending portion of said sub-frame; a second upper control arm pivotally connected at each end thereof between said upper leading control arm mounting portion and said forwardly extending portion of said sub-frame; a coil spring mounted between said lower control arm spring mounting seat and said spring mounting portion of said sub-frame; a shock absorber mounted between said shock absorber bracket and said lower control arm intermediate said coil spring and said knuckle lower control arm mounting portion; a trailing arm having one end thereof fixedly secured to said knuckle and the other end thereof pivotally connected to the distal end of said forwardly extending portion of said sub-frame; and two isolators mounted on the outer surface of said spring mounting portion and on the distal end of said forwardly extending portion of said sub-frame for mounting said sub-assembly to said frame rail.

2. The independent rear suspension subassembly described in claim 1, wherein said first and second upper control arms extend adjacent opposite sides of said shock absorber.

3. The independent rear suspension subassembly described in claim 1, wherein said first upper control arm is longer than said second upper control arm.

4. The independent rear suspension sub-assembly described in claim 1, wherein said shock absorber is pivotally mounted at one end thereof on said lower control arm and resiliently connected at the other end thereof to said shock absorber bracket.

5. The independent rear suspension sub-assembly described in claim 1, wherein each of said laterally extending and forwardly extending portions of said sub-frame are formed as inverted U-shaped channels.

6. The independent rear suspension subassembly described in claim 5, wherein said lower control arm is pivotally mounted in said laterally extending inverted U-shaped portion, and said trailing arm is pivotally mounted in said forwardly extending inverted U-shaped portion.

7. The independent rear suspension subassembly described in claim 5, and first and second mounting brackets formed on the outside surfaces of said respective laterally extending and forwardly extending inverted U-shaped portions of said subframe, wherein said first upper control arm is pivotally mounted on said first mounting bracket and said second upper control arm is pivotally mounted on said second mounting bracket.

8. The independent rear suspension subassembly described in claim 1, and a wheel well housing on said vehicle, wherein said shock absorber bracket and said shock absorber extend upwardly into said wheel well housing without contacting same.

9. The independent rear suspension sub-assembly described in claim 1, and an anti-sway bar extending parallel to laterally extending portion, and secured at the ends thereof to said right and left hand knuckles.

10. An independent rear suspension sub-assembly for mounting on frame side rail means on either side of a vehicle, said sub-assembly comprising a sub-frame having oppositely disposed right and left hand rear suspension components mounted thereon, each said suspension component comprising a knuckle, and a four link system including a lower and two upper control arms and a trailing arm, each operatively connected between said knuckle and said sub-frame, a coil spring and a shock absorber operatively mounted between said lower control arm and said sub-frame such that said two upper control arms, which are of different lengths, extend laterally along opposite sides of said shock absorber, and two isolators mounted at predetermined spaced points on each side of said sub-frame securing said sub-assembly to an associated one of said frame side rail means, wherein said sub-frame comprises a laterally extending portion extending between said oppositely disposed right and left hand suspension components and a forwardly extending portion formed at each outside end of said laterally extending portion, wherein each said suspension component lower and two upper control arms are pivotally connected between their associated knuckle and said sub-frame, and whereby each said suspension component trailing arm extends longitudinally between its associated knuckle and said sub-frame such that each said suspension component trailing arm is fixedly secured to its associated knuckle and pivotally connected to its associated sub-frame forwardly extending portion.

* * * * *